Figure 1:
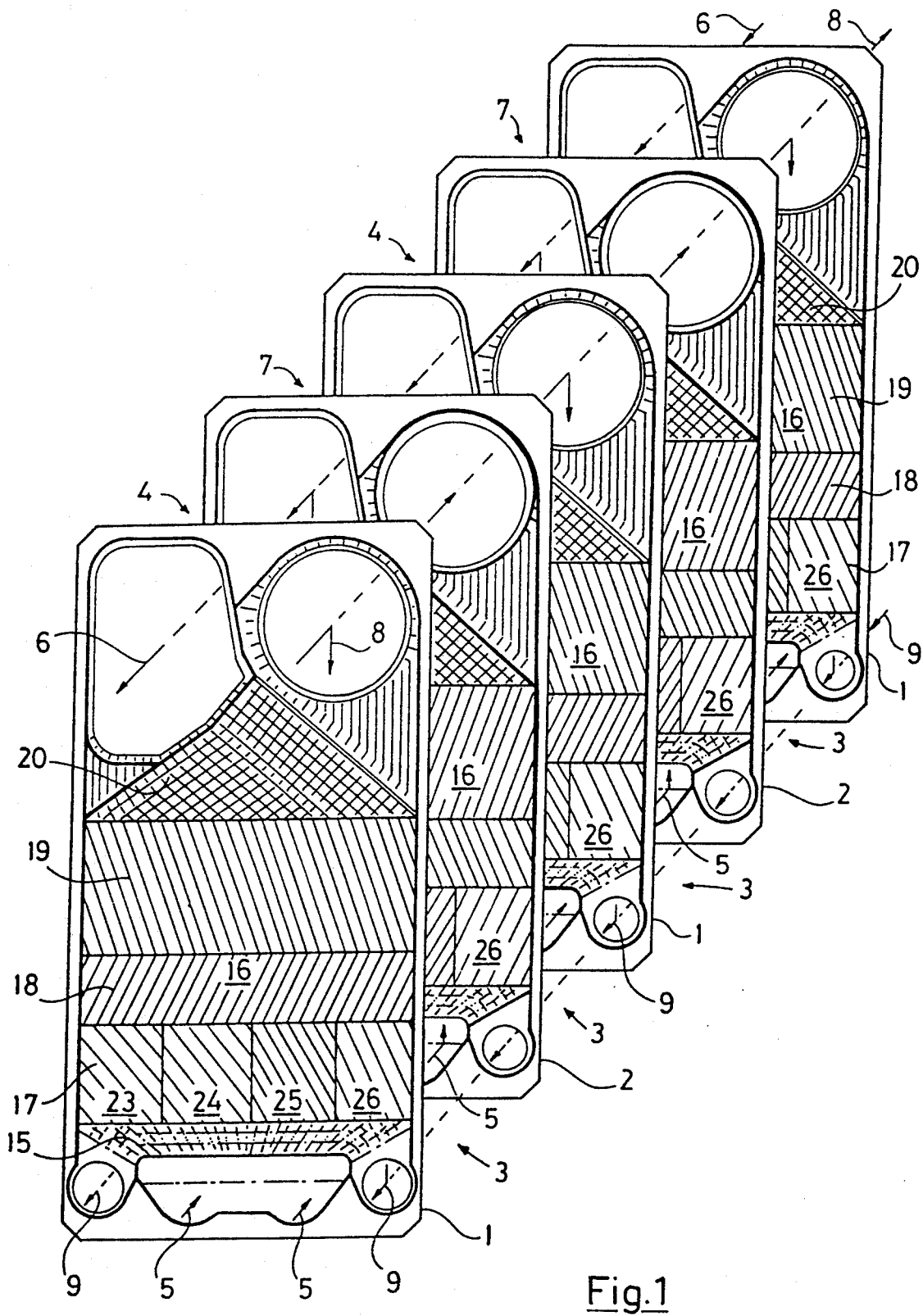

United States Patent [19]
Hallgren

[11] Patent Number: 5,226,474
[45] Date of Patent: Jul. 13, 1993

[54] PLATE EVAPORATOR

[75] Inventor: Leif Hallgren, Lund, Sweden

[73] Assignee: Alfa-Laval Thermal AB, Lund, Sweden

[21] Appl. No.: 761,798

[22] PCT Filed: Apr. 29, 1991

[86] PCT No.: PCT/SE91/00303
§ 371 Date: Sep. 16, 1991
§ 102(e) Date: Sep. 16, 1991

[87] PCT Pub. No.: WO91/17406
PCT Pub. Date: Nov. 14, 1991

[30] Foreign Application Priority Data
May 8, 1990 [SE] Sweden ................... 9001633

[51] Int. Cl.[5] ..................... F28F 13/08; F28F 3/08
[52] U.S. Cl. ..................... 165/110; 165/167; 165/903
[58] Field of Search ............. 165/166, 167, 903, 110

[56] References Cited
U.S. PATENT DOCUMENTS
2,872,165 2/1959 Wennerberg ............ 165/166
4,307,779 12/1981 Johansson et al. ...... 165/166

FOREIGN PATENT DOCUMENTS
204880 12/1986 European Pat. Off. .... 165/167

*Primary Examiner*—Albert W. Davis, Jr.
*Attorney, Agent, or Firm*—Davis Hoxie Faithfull & Hapgood

[57] ABSTRACT

In a plate heat exchanger for climbing film evaporating of a fluid, vertically arranged heat transfer plates (1, 2) delimit evaporating passages (4) and condensating passages (7) between themselves. Each evaporating passage (4) has a fluid inlet (5) at its lower portion and an outlet (6) for concentrated fluid and generated vapor at its upper portion, which outlet (6) is located at one vertical side of the heat transfer plates. To provide a desired distribution of the fluid and the vapor in each of the evaporating passages (4), at least alternate heat transfer plate (1), in its lower portion (17A) closest to the inlet (5), has been provided with a number of zones (23A-26A), having different pressing pattern of corrugation ridges and grooves. The corrugation ridges and grooves form different angles to the main flow direction of the fluid in the evaporating passages (4), which angles are chosen such that the ridges and grooves of the heat transfer plates (1, 2), according to their different directions, cooperate to provide in each evaporating passage a flow resistance for the fluid in its main flow direction, which gradually decreases from said ones vertical sides to the other vertical sides of the heat transfer plates (1, 2), The varying flow resistance laterally to the evaporating passages (4) is preferably concentrated to the lower portion of the evaporating passages.

2 Claims, 3 Drawing Sheets

PLATE EVAPORATOR

The present invention relates to a plate heat exchanger for evaporating a fluid, comprising a package of towards each other abutting rectangular and essentially vertically arranged heat transfer plates, delimiting flow spaces between themselves and being provided with corrugation pattern in the shape of ridges and grooves, said ridges intersectingly abutting each other in at least a part of each flow space and forming a number of supporting points between adjacent heat transfer plates, wherein alternate flow space forms an evaporating passage, which evaporating passage has an inlet for fluid at its lower portion and an outlet for fluid and generated vapour at its upper portion near one of the vertical sides of the heat transfer plates, and remaining flow spaces form passages for a heating fluid, which passages have inlets at their upper portions near the other vertical sides of the heat transfer plates and outlets at their lower portions.

At a known plate heat exchanger of this kind, described in DE-A1 3721132, the main part of the heat transfer portion of each heat transfer plate has one and the same kind of corrugation pattern over its entire surface. This has shown ineffective referring to the heat transfer capacity of the plate heat exchanger.

At the previously known plate heat exchanger an outlet duct for fluid and generated vapour extends further through the package of heat transfer plates, which outlet duct is formed of aligned openings of the heat transfer plates. The openings have been made as great as possible to minimize the flow resistance in the outlet duct for the produced vapour. In practice a large part of the upper portion of each heat transfer plate has been used for such opening. As also an inlet duct, intended for the heating fluid, must extend through the upper part of the package of heat transfer plates, it has not been possible to use the entire width of the heat transfer plates only for the outlet duct. This has resulted in that flow paths of different length have been formed in each evaporating passage between its inlet and its outlet for different parts of supplied fluid and vapour generated therefrom.

Owing to that the known heat transfer plates have one and the same kind of corrugation pattern over their heat transfer portions and thereby in each evaporating passage cause equal flow resistance per unit of length of each flow path for fluid and generated vapour, the total flow resistance will be largest along the longest flow path. Consequently, the smallest amount of fluid and vapour passes this path. This will lead to that not all of the fluid will be exerted to the same heat treatment and that the risk of drying out exists along the longest flow path, above all, near the inlet of the heating fluid.

An object of the present invention is to increase the efficiency of a plate heat exchanger of the introductory described kind, and to provide an uniform quality of the discharged fluid and generated vapour.

This object is obtained according to the invention in that in each evaporating passage, close to its inlet for fluid, at least one heat transfer plate is provided with a number of zones having different corrugation pattern, arranged adjacent to each other between the vertical sides of the heat transfer plate, the ridges and grooves of the heat transfer plates in the area of said zones forming different angles against the main flow direction of the fluid in the evaporating passages, which angles are chosen in such a way that the ridges and grooves in consequence of their different direction cooperate to provide a flow resistance in each evaporating passage, in its main flow direction, which gradually decreases from said one to said other vertical side of the heat transfer plate.

It is previously known that the heat transfer between each of two heat transfer plates and a heat transfer fluid, flowing through a passage between the plates, is influenced of how the towards each other abutting corrugation ridges of the heat transfer plates cross each other and extend in relation to the main flow direction of the heat transfer fluid. If the ridges cross each other with an obtuse angle, directed against the main flow direction of the fluid, a greater pressure drop of the fluid is obtained and a more efficient heat transfer is obtained than if the ridges cross each other with an acute angle, directed against the main flow direction of the fluid. With a plate heat exchanger according to the invention this technique can be used to provide flow resistance of different value and thus different size of the heat transfer in different sections of the passages, between the plates, near its inlet for fluid.

When a fluid, in a plate heat exchanger according to the invention, flows upwards through an evaporating passage and gradually evaporates, starting at one vertical side of the heat transfer plates, an increasing space is required for the produced vapour, in the evaporating passage close to said one side. By that, the flowing fluid from below is forced to distribute across the evaporating passage such that a larger amount of fluid will flow near the other vertical side of the heat transfer plate, than in case of the evaporation of the fluid starting at the same level over the entire width of the heat transfer plate. The result would be that the heat transfer surface of the heat transfer plates is used in the most efficient way. In addition, the risk of drying out in a part of each evaporating passage is reduced, owing to that a larger amount of fluid than else, passes near the inlet of the heating fluid.

In a preferred embodiment of a plate heat exchanger according to the invention, the corrugation patterns of the heat transfer plates are designed such that the difference in flow resistance, caused by the ridges and grooves of the corrugation pattern, from said one to said other vertical side of the heat transfer plate is located mainly to the lower part of each evaporating passage, in which, during operation supplied fluid has not yet become evaporated to any important extent, while corresponding difference in flow resistance is essentially lower or non-existing in other levels in each evaporating passage. By this the desired distribution effect of fluid and generated vapour is obtained in every part of the evaporating passage, without any undesired resistance being formed against an efficient distribution of the incoming heating fluid, which normally is intended to be steam, in the upper parts of the passages for said fluid. A corrugation pattern of ridges and grooves being pressed in a heat transfer plate of the present kind, will effect the flow of fluid on both sides of the heat transfer plate. At the lower part of the passages for the heating steam a major part of the steam has already condensed.

Figure 2:
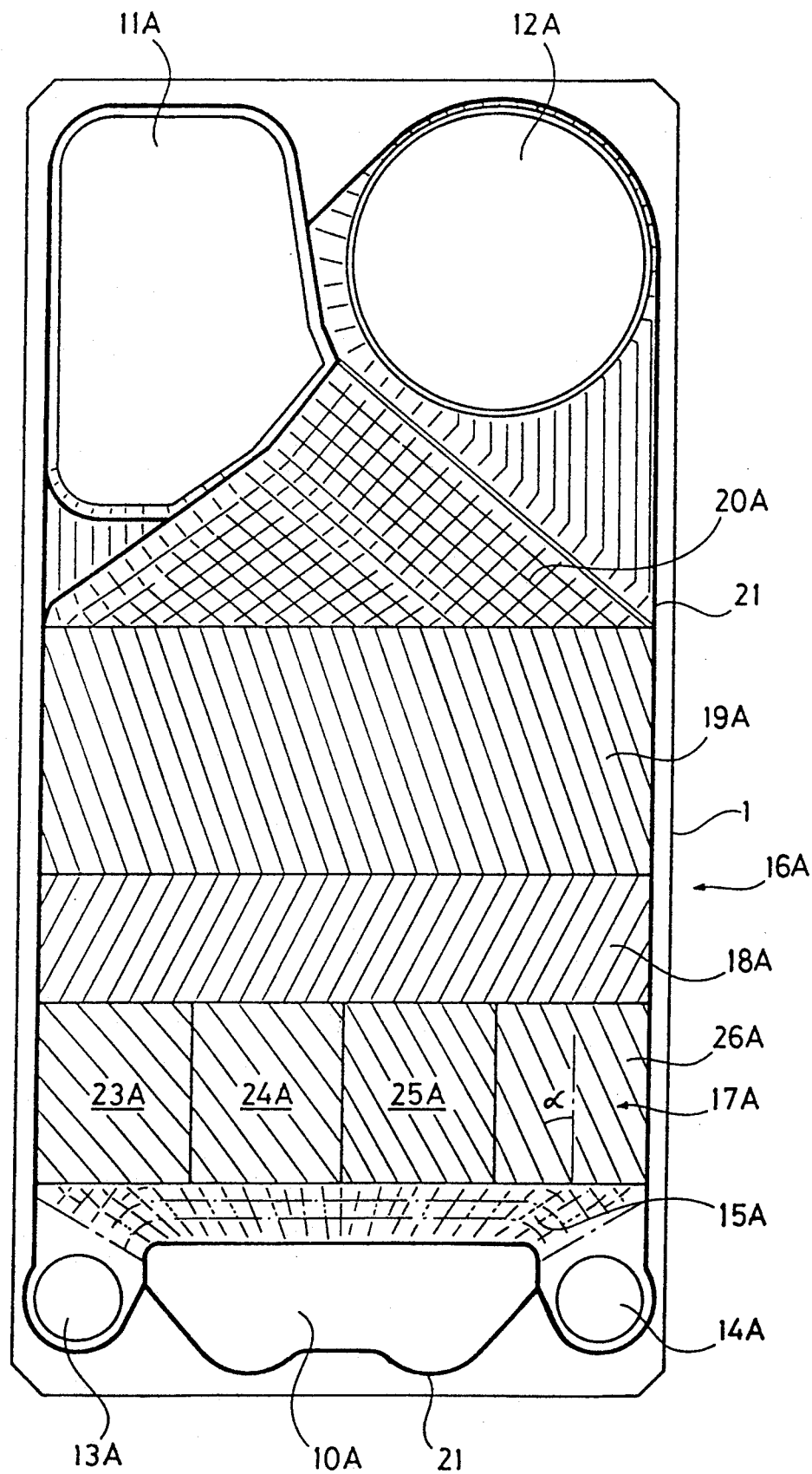
Figure 3:
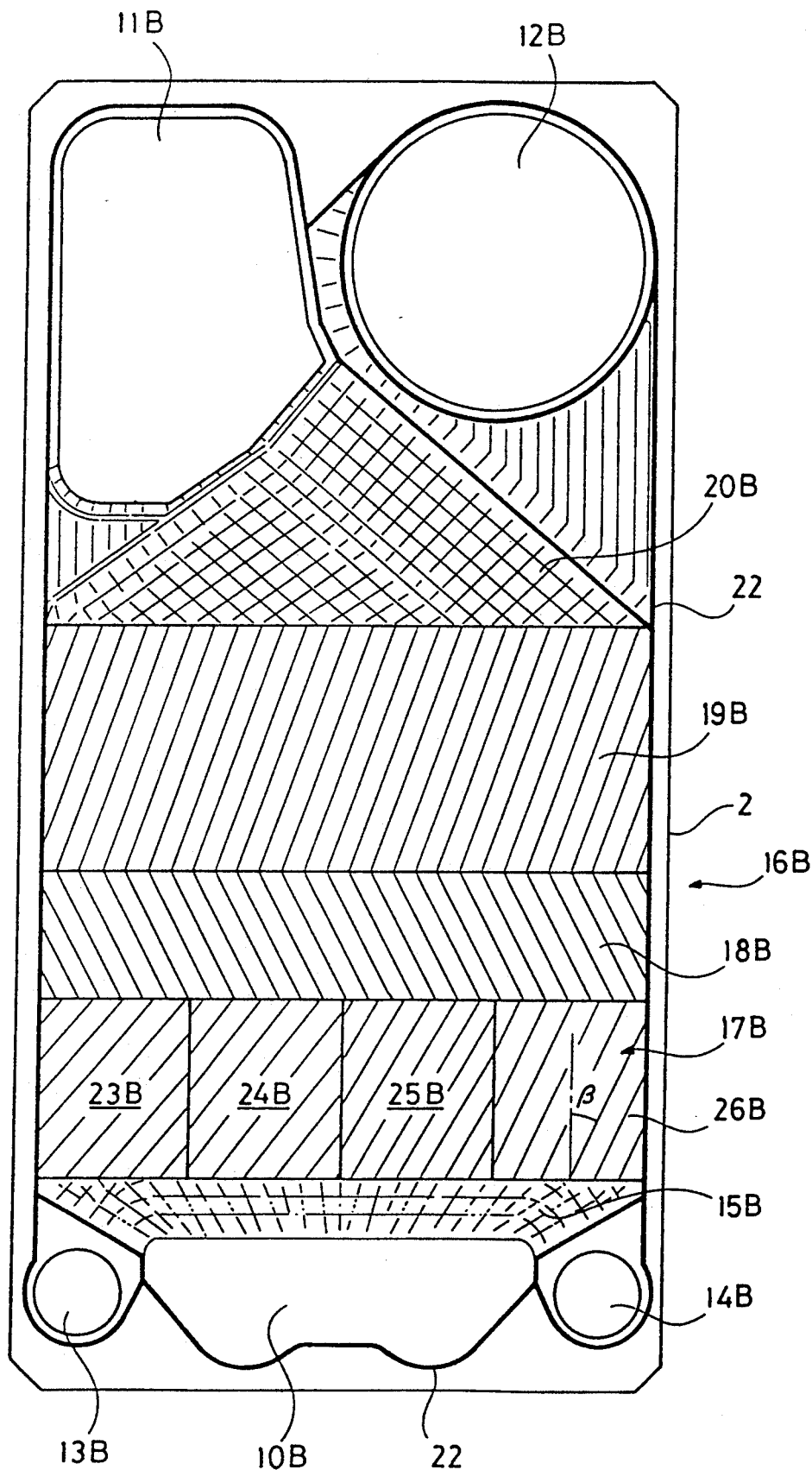

The invention will be described in the following in more detail with reference to the accompanying drawings, in which FIG. 1 shows a schematically exploded view of a plate heat exchanger formed in accordance with the invention and comprising two units of heat transfer plates, FIG. 2 shows a schematically front view of a first kind of heat transfer plate, and FIG. 3 shows a schematical front view of a second kind of heat transfer plate.

The plate heat exchanger shown in FIG. 1 comprises two kinds of rectangular, elongated heat transfer plates, which have been provided with different corrugation pattern, by means of pressing, one first kind of heat transfer plates 1 and a second kind of heat transfer plates 2. The heat transfer plates, which are intended to be kept together in a frame (not shown) in a conventional manner, may be provided with rubber gaskets along their edges to delimit flow spaces 3 between themselves, but as an alternative they could be permanently joined to each other, e.g. through soldering, welding or gluing.

The heat transfer plates 1 and 2 have been provided with a corrugation pattern in shape of ridges and grooves by means of pressing, the ridges of two adjacent heat transfer plates in the flow spaces 3 crossing and abutting each other to form a number of supporting points between the heat transfer plates. Each second of such flow space 3 forms a passage 4 for evaporating of a fluid, which passage communicates with a fluid inlet 5 extending through a lower portion of the heat transfer plates and an outlet 6 for fluid and generated vapour, which extends through an upper portion of the heat transfer plates. Remaining flow spaced form passages 7 for a heating fluid, which passages communicate with a steam inlet 8 extending through the upper portion of the heat transfer plates, and two condensate outlets 9 extending through the lower portion of the heat transfer plates.

The heat exchanger shown in FIG. 1 is principally intended for evaporation or concentration of various liquid products by means of climbing film evaporation. The long sides of the heat transfer plates 1 and 2 are arranged vertically, and fluid to be evaporated is supplied to the passages 4 at their lower portion and discharged at their upper portion.

When counterflow heat exchanging is preferred the plate heat exchanger is arranged for falling film evaporating and steam as heating medium is supplied at the upper portion of the passages 7 and produced condensate is discharged at the lower portion of the passages 7.

Each of the heat transfer plates 1 and 2 has a lower distribution portion 15, a heat transferring portion 16, divided in different horizontally extended portions 17, 18 and 19 having different corrugation pattern, and an upper distribution portion 20. The lower distribution portion 15 is arranged to convey fluid in each passage 4, essentially vertically upwards from the inlet 5 to the heat transfer portion 16, and in each passage 7, to convey the condensate both vertically downwards and horizontally towards the outlets 9. The upper distribution portion is formed in a manner which appears more closely in U.S. Pat. No. 3,783,090.

The lower horizontally extended portion 17 is divided in a number of zones 23, 24, 25 and 26 having different corrugation pattern, and being arranged adjacent to each other near to said inlet 5 for the fluid in each of the evaporating passages 4. The ridges and grooves in the zones 23, 24, 25 and 26 are directed in such a way that they cooperate to provide a flow resistance for the upwardly flowing fluid and generated vapour in each evaporating passage 4, which gradually decreases from the ones to the others of the longsides of the heat transfer plates. By this a desired distribution of the flow of fluid is achieved in the evaporating passages 4 between said longsides.

The heat transfer plates 1 and 2 shown in FIGS. 2 and 3 have punched holes at each of their ends. These holes form a port 10A and 10B, respectively, at the bottom, for the fluid to be evaporated, a port 11A and 11B, respectively at the top, for concentrated fluid and generated vapour, a port 12A and 12B, respectively, at the top for heating steam and two ports 13A, 14A and 13B, 14B, respectively, at the bottom, for condensate and eventually uncondensated steam of the heating medium.

The heat transfer plates 1 and 2 are further provided with lower distribution portions 15A and 15B, respectively, upper distribution portions 20A and 20B, respectively and heat transfer portions 16A and 16B, respectively, which latter are divided in different horizontally extended portions 17A, 18A, 19A and 17B, 18B, 19B, respectively, having different corrugation pattern. The lower portions 17A and 17B, respectively, of each plate are divided in different vertically extended zones 23A, 24A, 25A, 26A and 23B, 24B, 25B, 26B, respectively, having different corrugation pattern.

The heat transfer plate 1 has on one if its sides a number of grooves 21 housing a gasket formed in one piece. The gasket extends around each of the ports 10A and 10B and around the whole periphery of the plate. Similarly, the heat exchange plate 2 has a number of grooves 22 and placed therein, a gasket extending around each of the ports 12B, 13B and 14B and around the whole periphery of the plate. The gaskets are arranged to seal between adjacent heat transfer plates 1 and 2. The gasket grooves can, as an alternative, be formed such that two adjacent plates may be welded together having the bottom of the grooves turned against each other, wherein only alternate plate interspace is provided with a gasket, which in such case occupies two grooves facing each other in adjacent heat transfer plates.

In the horizontally extended portions 17A-19A and 17B-19B, respectively, the ridges and the grooves incline differently against the intended main flow direction of the fluid. Accordingly, the gradient decreases from one zone to another from below and upwards.

Fluid which is to be completely or partly evaporated is supplied into the plate heat exchanger through the fluid inlet 5 which is located in the lower part of the heat transfer plates, and then flows upwards through the passage 4. Fluid is even distributed across the width of the heat transfer plates between the lower distribution portions 15A and 15B. Between the heat transfer portions 16A and 16B the fluid first passes the portions 17A and 17B, which include the four zones 23A, 24A, 25A, 26A and 23B, 24B, 25B, 26B, respectively. The zones 23A and 23B, located at one longside of the plate, have a corrugation pattern providing a relatively great flow resistance in the evaporation passages 4 for upwardly flowing fluid, i.e. the ridges of the plates cross each other with a comparatively large intervening angle directed against the flow direction of the fluid. Thus, the heat transfer between the plates and the fluid becomes relatively efficient and consequently, vapour is generated relatively soon in these portions of the passages 4.

In the corrugation zones 23A-26A and 23B-26B, respectively, the ridges and grooves incline differently against the intended main flow direction of the fluid. Thus, the gradient decreases from one zone to another from the one to the other longside of each plate. In the embodiment of the invention shown in the drawing an angle α of the plate 1 between the main flow direction of the fluid (shown with a vertical dash and dot line) and the extension of the corrugation ridges is −40° in the zone 23A, −36° in the zone 24A, −30° in the zone 25A and −22° in the zone 26A. In the plate 2 an angle B between the flow direction of the fluid and the extension of the corrugating ridges is +40° in the zone 23B, +36° in the zone 24B, +30° in the zone 25B and +22° in the zone 26B. As a result the intermediate angle for the intersecting ridges of the plates 1 and 2 will be 80° in the zones 23A and B, 72° in the zones 24A and B, 60° in the zones 25A and B and 44° in the zones 26A and B. For the portions 17A and 17B the average angle will be about 64°. Corresponding angle is 50° for the portions 18A and 18B and 40° for the portions 19A and 19B. The value given on these angles has been chosen with reference to a certain heat exchange task for the present heat exchanger. Other values can of course be chosen for other heat exchange tasks.

From the spaces between the portions 17A and 17B fluid and generated vapour continue upwards in the evaporating passage between the portions 18A and 18B and between the portions 19A and 19B, which have gradually decreasing angle between the crossing ridges, i.e. a more and more acute intervening angle is formed by the ridges, directed against the flow direction. The flow resistance for the fluid and generated vapour thus decreasing gradually partly from one longside to the other of each plate in the area of the portions 17A and 17B and partly in the flow direction of the fluid in the area of the portions 17A–19A and 17B–19B. Fluid and generated vapour then continue to the upper distribution areas 20A and 20B and further through the outlet 6.

In the passages 7 for the heating medium, the flow is performed in opposite direction. Steam is thus supplied through the steam inlet 8 (FIG. 1) and is in the passages 7 subjected to a gradually increasing flow resistance. In FIG. 1 two condensate outlets 9 are shown, but only one need be used. Owing to that the flow resistance between the portions 17A and 17B of the plates is bigger at the one longside than at the other longside of each heat transfer plate, this will effect the distribution of the heating fluid in the lower parts of the passages 7. Since the laterally varying flow resistance is limited to the lower parts of the passages 7, where the main part of the supplied steam has condensated, this will not effect the distribution of steam in the upper parts of the passages 7 to any essential extent.

In the embodiment of the invention shown in the drawings, both of the heat transfer plates 1 and 2 have several horizontal extended portions 17, 18 and 19 with different corrugation pattern, and several different zones in the portions 17. However, it should be possible to obtain the aimed effect of the invention even if only the heat transfer plates of one kind were provided with heat transfer portions divided in this way, while the heat transfer plates of the other kind had one and the same corrugation pattern over their entire heat transfer portions. In addition the different portions of the plates 17A–19A, 23A–26A and 17B–19B, 23B–26B, respectively, have been shown located right opposite to each other, but as an alternative they could be located so that they only partly overlap each other. Also the number of portions and the size of the portions could of course vary.

I claim:

1. Plate heat exchanger for evaporating a fluid, comprising a package of towards each other abutting rectangular and essentially vertically arranged heat transfer plates (1, 2), delimiting flow spaces between themselves and being provided with corrugation pattern in the shape of ridges and grooves, said ridges intersectingly abutting each other in at least a part of each flow space and forming a number of supporting points between adjacent heat transfer plates (1, 2), wherein alternate flow space forms an evaporating passage (4) for said fluid, which evaporating passage has an inlet (5) for fluid at its lower portion and an outlet (6) for fluid and generated vapour at its upper portion near one of the vertical sides of the heat transfer plates, and remaining flow spaces form passages (7) for a heating fluid, which passages have inlets (8) at their upper portions near the other vertical sides of the heat transfer plates and outlets (9) at their lower portions, characterized in that in each evaporating passage (4), close to its inlet (5) for fluid, at least three zones (23A–26A) having different corrugation pattern, arranged adjacent to each other between the vertical sides of the heat transfer plate, the ridges and grooves of the heat transfer plates (1, 2) in the area of said zones forming different angles against the main flow direction of the fluid in the evaporating passages (4), which angles are chosen in such a way that the ridges and grooves in consequence of their different directions cooperate to provide a flow resistance in each evaporating passage (4), in its main flow direction, which gradually decreases from said one to said other vertical side of the heat transfer plate.

2. Plate heat exchanger according to claim 1, characterized in that the corrugation patterns of the heat transfer plates are designed such that the difference in flow resistance from said one to said other vertical sides of the heat transfer plates, caused by the ridges and grooves of the corrugation pattern, are concentrated to the lower part of each evaporating passage (4) in which fluid supplied during operation has not yet been evaporated to any essential extent.

* * * * *

UNITED STATES PATENT AND TRADEMARK OFFICE
CERTIFICATE OF CORRECTION

PATENT NO. : 5,226,474
DATED : July 13, 1993
INVENTOR(S) : Leif Hallgren

It is certified that error appears in the above-indentified patent and that said Letters Patent is hereby corrected as shown below:

Col. 6, line 32 (Claim 1) after "at", insert --least one heat transfer plate (1) is provided with at--.

Signed and Sealed this

First Day of March, 1994

Attest:

BRUCE LEHMAN

Attesting Officer    Commissioner of Patents and Trademarks